(12) United States Patent
Yamamoto et al.

(10) Patent No.: US 7,656,777 B2
(45) Date of Patent: Feb. 2, 2010

(54) OPTICAL RECORDING MEDIUM, OPTICAL INFORMATION PROCESSOR, AND OPTICAL RECORDING/REPRODUCING METHOD

(75) Inventors: Hiroaki Yamamoto, Kawabe-gun (JP); Teruhiro Shiono, Osaka (JP); Tatsuo Ito, Osaka (JP); Seiji Nishino, Osaka (JP); Sadao Mizuno, Ibaraki (JP)

(73) Assignee: Panasonic Corporation, Osaka (JP)

( * ) Notice: Subject to any disclaimer, the term of this patent is extended or adjusted under 35 U.S.C. 154(b) by 746 days.

(21) Appl. No.: 10/516,220

(22) PCT Filed: May 26, 2003

(86) PCT No.: PCT/JP03/06566

§ 371 (c)(1),
(2), (4) Date: Nov. 30, 2004

(87) PCT Pub. No.: WO03/102941

PCT Pub. Date: Dec. 11, 2003

(65) Prior Publication Data

US 2005/0207328 A1   Sep. 22, 2005

(30) Foreign Application Priority Data

May 31, 2002   (JP) ............................. 2002-159082

(51) Int. Cl.
*G11B 7/24* (2006.01)
(52) U.S. Cl. .................................... 369/275.1
(58) Field of Classification Search .................. 369/94, 369/275.1, 275.2, 275.4, 275.5; 428/64.1, 428/64.4; 430/320, 321, 270.11, 270.13
See application file for complete search history.

(56) References Cited

U.S. PATENT DOCUMENTS

| | | | | |
|---|---|---|---|---|
| 4,357,616 A | * | 11/1982 | Terao et al. | 346/135.1 |
| 5,202,875 A | | 4/1993 | Rosen et al. | |
| 5,420,728 A | * | 5/1995 | Kawase | 360/59 |
| 5,442,619 A | * | 8/1995 | Van Uijen et al. | 369/275.2 |
| 5,580,671 A | * | 12/1996 | Tamari et al. | 428/822.1 |
| 5,652,037 A | * | 7/1997 | Ohkawa et al. | 428/64.1 |

(Continued)

FOREIGN PATENT DOCUMENTS

EP   1 189 216   3/2002

(Continued)

*Primary Examiner*—Joseph H Feild
*Assistant Examiner*—Henok G Heyi
(74) *Attorney, Agent, or Firm*—Hamre, Schumann, Mueller & Larson, P.C.

(57) ABSTRACT

An optical recording medium which is a multilayer optical recording medium including a plurality of recording layers and records or reproduces information by the irradiation of light having a wavelength of $\lambda 0$. At least one recording layer out of a plurality of recording layers includes a variable absorption film. The variable absorption film contains a material in which an electron energy has a band structure, and the absorption end of an absorption spectrum moves toward a longer wavelength side with a rise in temperature when light is absorbed by transition between electron bands, has a first absorptance to light having a wavelength of $\lambda 0$ when a film temperature is a first temperature (application environment temperature), and has a second absorptance higher than the first absorptance to light having a wavelength of $\lambda 0$ when a film temperature is a second temperature higher than the first temperature.

14 Claims, 6 Drawing Sheets

U.S. PATENT DOCUMENTS

| | | | |
|---|---|---|---|
| 5,956,308 A * | 9/1999 | Akahira et al. | 369/53.29 |
| 6,232,036 B1 * | 5/2001 | Suzuki et al. | 430/270.16 |
| 6,379,767 B1 | 4/2002 | Park et al. | |
| 6,876,501 B2 * | 4/2005 | Kimura et al. | 359/719 |
| 6,987,721 B2 * | 1/2006 | Yamamoto et al. | 369/94 |
| 2002/0168588 A1 | 11/2002 | Takamori et al. | |
| 2003/0002428 A1 | 1/2003 | Cheong et al. | |
| 2003/0174629 A1 * | 9/2003 | Yamamoto et al. | 369/94 |
| 2004/0090900 A1 * | 5/2004 | Yoo et al. | 369/112.08 |
| 2007/0177481 A1 * | 8/2007 | Kimura et al. | 369/112.01 |

FOREIGN PATENT DOCUMENTS

| | | |
|---|---|---|
| JP | 59-193452 | 11/1984 |
| JP | 63-42045 | 2/1988 |
| JP | 2-22144 | 1/1990 |
| JP | 5-151591 | 6/1993 |
| JP | 7-320301 | 12/1995 |
| JP | 0 844 607 | 5/1998 |
| JP | 10-228676 | 8/1998 |
| JP | 2000-3529 | 1/2000 |
| JP | 2002-042378 | 2/2002 |
| JP | 2002042378 A * | 2/2002 |
| JP | 2002-230838 | 8/2002 |
| JP | 2002-312977 | 10/2002 |
| JP | 2002-342980 | 11/2002 |

* cited by examiner

PRIOR ART

US 7,656,777 B2

OPTICAL RECORDING MEDIUM, OPTICAL INFORMATION PROCESSOR, AND OPTICAL RECORDING/REPRODUCING METHOD

TECHNICAL FIELD

The present invention relates to an optical recording medium on/from which information is to be recorded/reproduced optically, such as an optical disk and an optical card, and an optical information processor and an optical recording/reproducing method for recording/reproducing information on/from the optical recording medium.

BACKGROUND ART

In recent years, large-capacity external storage devices are desired as society becomes more and more computerized. In optical recording of information, there is conventionally a limit to higher density achieved by reducing the size of a recording pit because of a diffraction limit defined by the wavelength of light and the numerical aperture of an objective lens. In order to solve the above-mentioned problem, multi-layer optical recording media having a plurality of recording layers are proposed (e.g., JP 5(1993)-151591 A). However, in such mutilayer-type optical recording media, a semitransparent film having a certain reflectance and transmittance with respect to light is used for the recording layers, which results in a light loss due to light reflection in recording layers other than a target recording layer. Moreover, with an upstream side in the traveling direction of incident light being the upper side, and a downstream side being the lower side, transmitted light also reaches layers located lower than the target recording layer, resulting in a further light loss.

In order to solve the above-mentioned problems, multi-layer optical recording media that use a nonlinear material having nonlinear optical characteristics for recording layers are proposed (e.g., JP 2000-3529 A).

Figure 11:
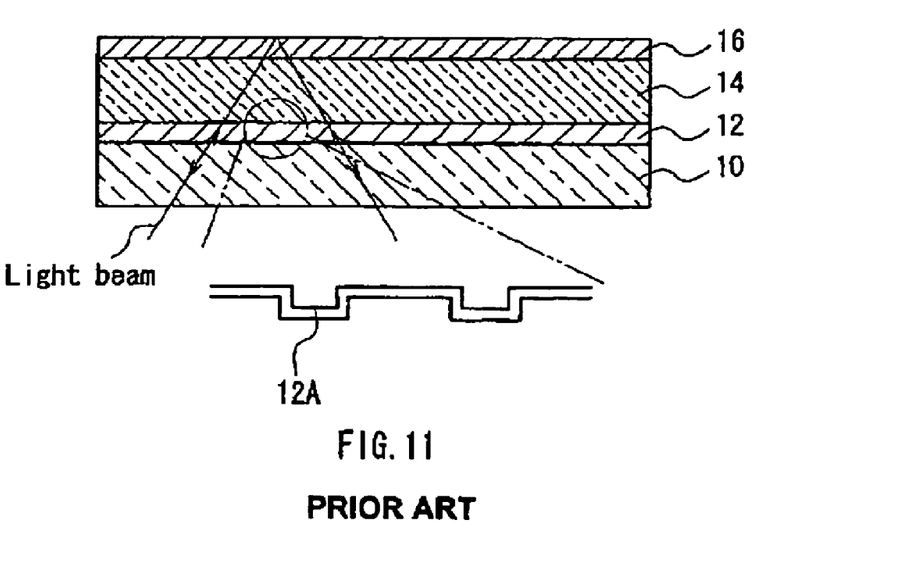
FIG. 11 is a cross-sectional diagram of a conventional multilayer recording medium.

FIG. 11 shows a cross-sectional configuration of a conventional multilayer optical recording medium. The optical recording medium as shown in FIG. 11 includes a first recording layer 12 located between a first light transmission film 10 and a second light transmission film 14, and a second recording layer 16 formed so as to be opposed to the first recording layer 12 with the second light transmission film 14 sandwiched therebetween. Further, the first recording layer 12 is provided with guide grooves 12A. The first recording layer 12 is formed of a nonlinear reflective material having a reflectance that nonlinearly increases with the intensity of light. As the nonlinear reflective material having such properties, a-Si, InSb, ZnTe, ZnSe, CdSSe, GaAs, GaSb, or the like may be used. When the first recording layer 12 is formed of such a nonlinear reflective material, the first recording layer 12 has a reflectance changing in accordance with $|(n-n_s)/(n+n_s)|^2$. Herein, "$n_s$" represents the refractive index of the light transmission films 10 and 14, and "n" represents the refractive index of the first recording layer 12 as a nonlinear reflective material. The nonlinear reflective material used here is a material that causes a phenomenon in which the refractive index changes depending upon the light intensity, i.e., a material having a great nonlinear optical effect.

The optical characteristics of such an optical recording medium will be described. When the first recording layer 12 is accessed, a light spot is formed on the first recording layer 12, and accordingly the first recording layer 12 is irradiated with a relatively intense light beam. The reflectance of the first recording layer 12 at this time may be 40%, for example. On the other hand, when the second recording layer 16 is accessed, a radiated light spot is formed on the second recording layer 16, and accordingly the first recording layer 12 is irradiated with relatively weak light. The reflectance of the first recording layer 12 at this time may be 30%, for example, which means the first recording layer 12 reflects 30% of incident light and transmits 70% thereof to the second recording layer 16 side. Thus, the second recording layer 16 can be accessed efficiently.

However, the above-described prior art provides only a 10% reflectance change, from 30% to 40%. This is a limit due to the fact that the material having nonlinear optical characteristics is used for the first and second recording layers 12 and 16, and there is a problem that an amount of light would be insufficient for an optical recording medium that is further multilayered. Further, the above-described prior art relates to a read-only memory (ROM) in which information is recorded previously. Thus, it is difficult to ensure the energy required for recording information so as to realize a recordable multi-layer optical recording medium with this art.

DISCLOSURE OF INVENTION

A first optical recording medium of the present invention is a multilayer optical recording medium including a plurality of recording layers for recording/reproducing information by irradiation with light having a wavelength $\lambda 0$, wherein at least one of the plurality of recording layers includes a variable absorption film, and the variable absorption film includes a material in which electron energy has a band structure and an absorption edge of an absorption spectrum moves toward a long wavelength side in accordance with a rise in temperature by light absorption caused by interband transition of an electron, has a first absorptance with respect to the light having the wavelength $\lambda 0$ when the variable absorption film has a first temperature, and has a second absorptance higher than the first absorptance with respect to the light having the wavelength $\lambda 0$ when the variable absorption film has a second temperature higher than the first temperature.

A second optical recording medium of the present invention is a multilayer optical recording medium including a plurality of recording layers for recording/reproducing information by irradiation with light having a wavelength $\lambda 0$, wherein at least one of the plurality of recording layers includes a variable absorption film and a recording film arranged close to the variable absorption film so that heat in the variable absorption film can be transmitted to the recording film, the variable absorption film includes a material in which electron energy has a band structure and an absorption edge of an absorption spectrum moves toward a long wavelength side in accordance with a rise in temperature by light absorption caused by interband transition of an electron, is transparent with respect to the light having the wavelength $\lambda 0$ when the variable absorption film has a first temperature, and absorbs the light having the wavelength $\lambda 0$ when the variable absorption film has a second temperature higher than the first temperature, and the recording film absorbs at least a part of the light having the wavelength $\lambda 0$ to generate heat when the recording film has the first temperature, and changes in optical characteristics at a predetermined temperature.

An optical information processor of the present invention includes: the first or second optical recording medium of the present invention; a light source for emitting light having a wavelength $\lambda 0$; a focusing optical system for focusing the light emitted from the light source upon a target recording layer included in the optical recording medium; and a photodetector for detecting light reflected by the optical recording medium, wherein an increased-light-absorption portion is formed in the variable absorption film by irradiation with the light emitted from the light source, and information is recorded or reproduced by raising a temperature of the increased-light-absorption portion.

An optical recording/reproducing method of the present invention is a method for recording and reproducing information on/from the first or second optical recording medium of the present invention, the method including: forming an increased-light-absorption portion in a variable absorption film included in the recording layer by focusing light having a wavelength λ0 upon a target recording layer; and recording/reproducing information in/from the recording layer by raising a temperature of the increased-light-absorption portion.

BEST MODE FOR CARRYING OUT THE INVENTION

According to a first and a second optical recording media of the present invention, a variable absorption film is provided, and therefore it is possible to ensure the energy required for recording information even on multilayer optical recording media including a plurality of recording layers, thereby allowing a large capacity to be realized. Further, a sufficient amount of reproduction light can be obtained when recorded information is reproduced.

In the first optical recording medium of the present invention, it is preferable that at the first temperature, the variable absorption film absorbs light having a wavelength λ0 as the result of light absorption caused by interband transition of an electron in the material. However, the variable absorption film also may absorb the light having the wavelength λ0 as the result of light absorption by impurities.

In the first optical recording medium of the present invention, it is preferable that a recording layer including the variable absorption film further includes a recording film, which is arranged close to the variable absorption film so that heat in the variable absorption film can be transmitted to the recording film, and changes in optical characteristics at a predetermined temperature. This makes it possible to select a recording material as appropriate, resulting in an increase in recording stability, and a further increase in recording efficiency and amount of reproduction light.

In the first optical recording medium of the present invention, it is preferable that the variable absorption film changes in optical characteristics at a predetermined temperature. This allows the variable absorption film to serve also as a recording film, and thus no additional recording film is required to be formed.

In the first optical recording medium of the present invention, it is preferable that the plurality of recording layers consist of n ("n" is an integer equal to or larger than 2) layers, each including the variable absorption film, and when a recording layer that is m-th ("m" is an integer satisfying 1<m≦n) in order from a light incident side among the plurality of recording layers is an m-th recording layer, a reflectance $R_m$ of the m-th recording layer with respect to the light having the wavelength λ0 and an absorptance $A_m$ of the variable absorption film included in the m-th recording layer satisfy following relationships at the first temperature:

$$R_m = R_n/(n-m+1) \quad (1)$$

$$A_m = A_n/(n-m+1). \quad (2)$$

When the above-described formulas (1) and (2) are satisfied, the respective recording layers have almost the same amount of absorbed light even when the intensity of recording light is not changed for each recording layer.

In the first and second optical recording media of the present invention, it is preferable that the variable absorption film includes at least one selected from the group consisting of $Bi_2O_3$, $As_2S_3$, a mixed glass including $TeO_2$ and $Na_2O$, a mixed glass including $TeO_2$ and $WO_3$, a mixed glass including $TeO_2$ and $Fe_2O_3$, a mixed glass including $TeO_2$ and $CuO$, a mixed glass including $TeO_2$, $CaO$, and $WO_3$, aluminum-gallium-arsenic (AlGaAs) as a compound semiconductor, and aluminum-gallium-indium-arsenic (AlGaInAs) as a compound semiconductor.

In the first and second optical recording media of the present invention, it is preferable that the first temperature is an ambient temperature of use of the optical recoding media.

According to an optical information processor of the present invention, information can be recorded on the first or second optical recording medium of the present invention, and a sufficient amount of reproduction light can be obtained when recorded information is reproduced.

In the optical information processor of the present invention, it is preferable further to include a control part for controlling an intensity of the light emitted from the light source so that the increased-light-absorption portion formed in the variable absorption film is smaller than a spot size of the focused light. This allows super-resolution reproduction to be performed.

According to an optical recording/reproducing method of the present invention, information can be recorded on the first or second optical recording medium of the present invention, and a sufficient amount of reproduction light can be obtained when recorded information is reproduced.

In the optical recording/reproducing method of the present invention, it is preferable to control an intensity of the light so that the increased-light-absorption portion formed in the variable absorption film is smaller than a spot size of the focused light. This allows super-resolution reproduction to be performed.

Hereinafter, embodiments of the present invention will be described with reference to the drawings.

Embodiment 1

Figure 1:
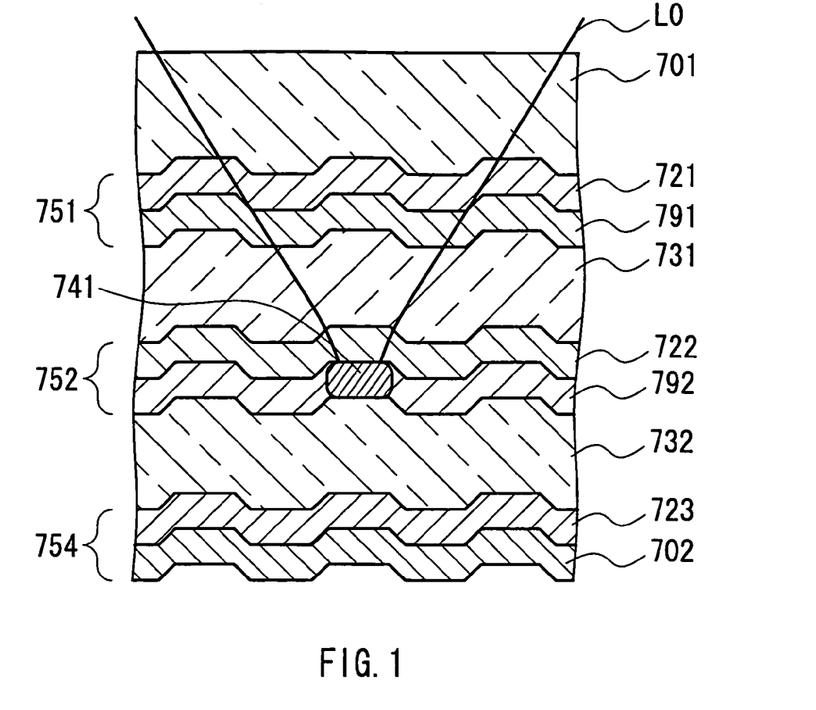
FIG. 1 is a schematic diagram showing a cross-sectional configuration of an optical recording medium according to Embodiment 1 of the present invention, and the state where information is recorded/reproduced on/from the optical recording medium.

FIG. 1 shows a cross-sectional configuration of an optical recording medium of Embodiment 1 of the present invention. The optical recording medium is a multilayer optical recording medium including a substrate 701 on which a first recording layer 751, a second recording layer 752, and a final recording layer 754 are provided in this order from the incident side of light L0. Separation layers 731 and 732 are provided between the respective recording layers. The light L0 has a wavelength λ0, and is radiated when information is recorded or reproduced on/from the optical recording medium of the present embodiment.

The first and second recording layers 751 and 752 have the same film configuration, in which a recording film 721 (722) and a variable absorption film 791 (792) are provided in this order from the incident side of the light L0.

Further, the final recording layer 754 including a recording film 723 and a reflective film 702 is arranged so as to sandwich the separation layer 732 with the second recording layer 752.

The respective recording layers 751, 752, and 754 are provided with guide grooves as a concave-convex pattern for locating a recording position.

The separation layers 731 and 732 are made of a material that is transparent with respect to the light L0, such as PMMA (polymethyl methacrylate).

The recording films 721 and 722 included in the first and second recording layers 751 and 752, respectively, are almost transparent with respect to the light L0 having the wavelength λ0 used as recording light and reproduction light, and have properties in which the recording films change from an unrecorded state to a recorded state at a predetermined temperature. Here, the recorded state indicates the state where the optical characteristics have changed from those in the unrecorded state, i.e., the state where the optical characteristics have changed following a physical or chemical change such as, for example, a change in refractive index, extinction coefficient, and shape. The recording films 721 and 722 are formed of a material that is almost transparent with respect to the light L0 having the wavelength λ0, and causes a change in optical characteristics at a predetermined temperature, such as an organic dye, a heat polymerizable resin, a heat deformable resin, a heat decomposable resin, or the like. To be specific, when the wavelength λ0 is 405 nm, for example, 2-[7-(1,3-dihydro-5-methoxy-1,3,3-trimethyl-2H-indole-2-ylidene)-1,3,5-heptatrienyl]-5-methoxy-1,3,3-trimethyl-3H-indolium perchlorate (e.g., NK-2882manufactured by HAYASHIBARA Biochemical Laboratories, Inc.) as an organic dye or the like, for example, may be used. Further, when the wavelength λ0 is 630 nm, 2-[2-[4-(dimethylamino) phyenyl] ethenyl]naphth [1,2-d]thiazole (e.g., NK-1886 manufactured by HAYASHIBARA Biochemical Laboratories, Inc.) or the like, for example, may be used. Furthermore, an acrylic heat polymerizable resin, a heat deformable resin such as PMMA and polyester, and a heat decomposable resin such as benzotriazole may be used for both light having a wavelength of 405 nm and light having a wavelength of 630 nm.

The variable absorption films 791 and 792 included in the first and second recording layers 751 and 752, respectively, are made of a material in which electron energy has a band structure and the absorption edge of an absorption spectrum moves toward a long wavelength side (low energy side) in accordance with a rise in temperature by light absorption caused by interband transition of an electron. The absorption edge is an edge of the absorption spectrum on the low energy side.

Figure 2:
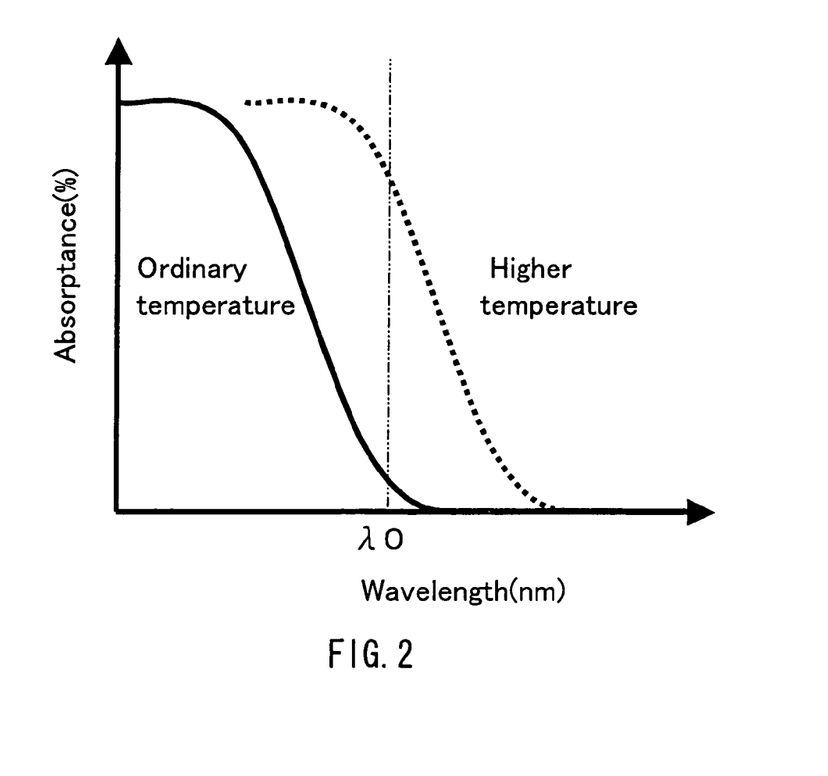
FIG. 2 is a diagram showing an example of the spectral absorptance curve of a variable absorption film included in the optical recording medium according to Embodiment 1 of the present invention.

FIG. 2 shows an example of the spectral absorptance curve of the variable absorption films 791 and 792 in the present embodiment. As shown in FIG. 2, the variable absorption films 791 and 792 are films that change in spectral characteristics with respect to the absorptance depending upon the temperature, and are formed of a material having properties in which the films would exhibit a lower absorptance (first absorptance) with respect to light having a wavelength λ0 the films have an ordinary temperature, and when the films have a higher temperature, the films would exhibit a higher absorptance (second absorptance) with respect to the light having the wavelength λ0 since the absorption edge moves toward the long wavelength side. Thus, when the variable absorption films 791 and 792 are irradiated with the light L0 having the wavelength λ0 as recording light or reproduction light, they initially absorb the light at a lower absorptance, and then absorb the light at a higher absorptance at a temperature higher than the ordinary temperature since a rise in temperature is caused by the initial light absorption to increase the absorptance. The ordinary temperature as used herein is a temperature at which the optical recording medium is used, i.e., an ambient temperature of the optical recording medium. Further, the absorption of the light having the wavelength λ0 by the variable absorption films 791 and 792 at the ordinary temperature may not necessarily be caused only by interband transition of an electron in a material having the above-described properties included in the variable absorption films 791 and 792, but may be caused also by impurities.

It is necessary for the variable absorption films 791 and 792 to include a material having the above-described properties with respect to the light L0 having the wavelength λ0. Such a material may be $Bi_2O_3$, a mixed glass of $TeO_2$ and $Na_2O$, a mixed glass of $TeO_2$ and $WO_3$, a mixed glass of $TeO_2$ and $Fe_2O_3$, a mixed glass of $TeO_2$ and $CuO$, and the like when the wavelength λ0 is 405 nm. Above all, $Bi_2O_3$ is preferable. Further, when the wavelength λ0 is 630 nm, $As_2S_3$, AlGaAs as a compound semiconductor, AlGaInAs as a compound semiconductor, and the like may be used. Above all, $As_2S_3$ is preferable.

The recording film 723 included in the final recording layer 754 is made of a material that absorbs the light L0 having the wavelength λ0, and has properties in which the film changes from an unrecorded state to a recorded state by the absorption of the light L0 having the wavelength λ0. As a material for the recording film 723, tellurium oxide ($TeO_x$) or the like, for example, may be used. Further, a metal film including Al or the like may be used for the reflective film 702.

Next, an operation for recording/reproducing information on/from the optical recording medium of the present embodiment will be described.

Figure 10:
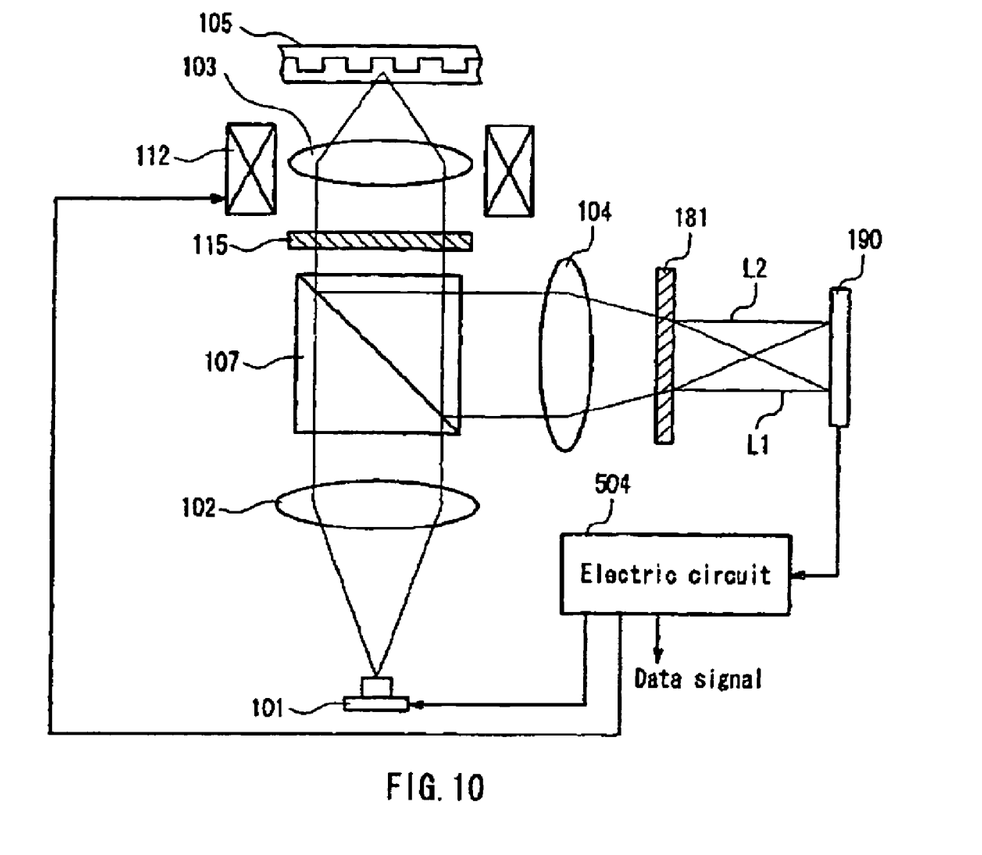
FIG. 10 is a schematic diagram showing a general configuration of an optical information processor as one embodiment of the present invention.

FIG. 10 shows an example of an optical information processor for recording/reproducing information on/from the optical recording medium of the present embodiment. Hereinafter, a method for recording/reproducing information on/from the optical recording medium of the present embodiment using the optical information processor will be described.

The optical information processor of the present embodiment is provided with a semiconductor laser 101 as a radiation source, and a collimating lens 102, a polarization beam splitter 107, a quarter wave plate 115, and an objective lens 103 fixed to an actuator 112 are arranged in a light path from the semiconductor laser 101 to an optical recording medium 105. In recording, emitted light from the semiconductor laser 101 is collimated by the collimating lens 102. The collimated light is transmitted through the polarization beam splitter 107, and is converted into circularly polarized light by the quarter wave plate 115. Then, the circularly polarized light is focused upon the optical recording medium 105 by the objective lens 103. Consequently, information is recorded. In reproducing, reflected light of the light focused upon the optical recording medium 105 is used. The light reflected by the optical recording medium 105 is converted into collimated light by the objective lens 103. The collimated light is converted into linearly polarized light by the quarter wave plate 115, and is reflected by the polarization beam splitter 107. The light reflected by the polarization beam splitter 107 is converted into converging light by a detection lens 104, and then is diffracted and separated (L1, L2) by a hologram element 181. The light beams are detected by a photodetector 190. The photodetector 190 has a plurality of light-receiving regions as detection regions, and inputs signals detected in the respective regions to an electric circuit 504. The electric circuit 504 takes out a data signal from the inputted signals. In this manner, information is reproduced. Further, the electric circuit 504 obtains a servo signal for controlling the position of the objective lens 103 to drive the actuator 112. Furthermore, the electric circuit 504 controls the output of the semiconductor laser so that the obtained data signal has an optimal quality.

FIG. 1 shows the state where information is recorded (or reproduced) in (from) the second recording layer 752, for example. The light L0, which is a laser beam having the wavelength λ0, is focused upon the second recording layer 752 of the optical recording medium by the objective lens 103 (see FIG. 10) of the optical information processor. The position of the objective lens 103 is controlled by the actuator 112 (see FIG. 10).

First, an operation for recording information will be described specifically.

The light L0 passes through the substrate 701, the first recording layer 751, and the separation layer 731, to be incident upon the second recording layer 752. Although the light L0 is absorbed slightly by the variable absorption film 791 when passing through the first recording layer 751, the variable absorption film 791 is kept at an approximately ordinary temperature since the light is not focused upon the surface of the variable absorption film 791 and the energy density of heat generation is low. Thus, the light L0 can be transmitted through the first recording layer 751 efficiently and, further, the separation layer 731, to reach the second recording layer 752.

The light L0 incident upon the second recording layer 752 is transmitted through the recording film 722 to be incident upon the variable absorption film 792. Since the variable absorption film 792 has a low absorptance with respect to the light L0 having the wavelength λ0, the film absorbs a part of the incident light L0 to generate heat. Since the light L0 is focused upon the variable absorption film 792, the energy density of heat generation is high. Accordingly, the variable absorption film 792 locally rises in temperature at the portion upon which the light L0 is incident. The rise in temperature increases the absorptance of the variable absorption film 792 with respect to the light L0, resulting in a formation of an increased-light-absorption portion 741 in the variable absorption film 792. The increased-light-absorption portion 741 further rises in temperature by increasingly absorbing the light L0. Finally, when heat generation in the increased-light-absorption portion 741 of the variable absorption film 792 and heat diffusion in the recording film 722 or the like become balanced in amount, the temperature of the increased-light-absorption portion 741 stops rising.

Heat generated in the increased-light-absorption portion 741 of the variable absorption film 792 is diffused in the recording film 722. A rise in temperature of the recording film 722 caused by the diffused heat allows information to be recorded in the recording film 722. More specifically, the heat diffusion makes the temperature of the recording film 722 reach a predetermined temperature (hereinafter, referred to as a "recording temperature") at which the recording film 722 changes in optical characteristics, and a portion (recording mark) where the optical characteristics have changed is formed in a portion where the recording temperature has been reached.

Next, an operation for reproducing information recorded in the recording film 722 of the second recording layer 752 will be described.

The temperature and absorptance of the variable absorption film 792 are increased by means of the incident light L0 in the same manner as in recording. The difference from the time of recording is that the intensity of the light L0 is controlled so that the temperature of the recording film 722 is prevented from rising to the recording temperature by heat generation in the variable absorption film 792. A principle for reading out information recorded on the optical recording medium of the present embodiment is as follows.

A reflectance R with respect to the light L0 on the interface between the recording film 722 and the variable absorption film 792 is expressed by the following formulas, in which "n0" represents the refractive index of the recording film 722, "n" represents the refractive index of the variable absorption film 792, and "k" represents the extinction coefficient of the variable absorption film 792.

$$R=((N-n0)/(N+n0))^2 \quad (3)$$

$$N=(n^2+k^2)^{1/2} \quad (4)$$

When the variable absorption film 792 rises in temperature from the ordinary temperature, the absorptance with respect to the light L0, i.e., the extinction coefficient, increases. As a result, the reflectance R and, accordingly, an amount of reflected light increase in accordance with the formulas (3) and (4). Reflected light is modulated by the recording mark in the recording film 722 and used for detecting information. Thus, an increase in the amount of reflected light allows high-efficiency signal detection.

While information is recorded/reproduced in/from the second recording layer 752 in the above description, information may be recorded/reproduced in/from the first recording layer 751 similarly by focusing the light L0 upon the first recording layer 751.

Further, information is recorded/reproduced in/from the final recording layer 754 by focusing the light L0 upon the final recording layer 754. The light L0 is incident upon the first and second recording layers 751 and 752 before reaching the final recording layer 754. Since the light L0 is not focused upon the variable absorption films 791 and 792, regions of heat generation are dispersed, and thus a rise in temperature is small. Therefore, no increased-light-absorption portion is formed, allowing the light L0 to be transmitted. In recording information, the recording film 723 rises in temperature by absorbing the light L0, and a recording mark is formed. In reproducing information, light reflected by the reflective film 702 is detected.

Figure 3:
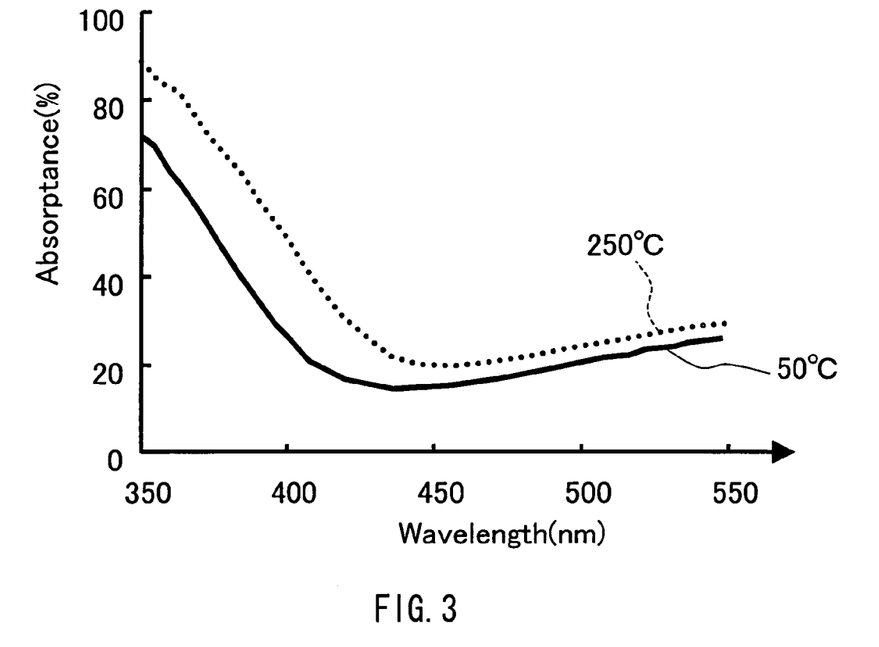
FIG. 3 is a diagram showing the spectral absorptance curve of $Bi_2O_3$.

Next, a description will be given in further detail of the characteristics of $Bi_2O_3$ as a material that can be used for the variable absorption films 791 and 792 of the optical recording medium of the present embodiment. FIG. 3 is a diagram showing the result of measuring the spectral characteristics with respect to the absorptance of $Bi_2O_3$ at 50° C. and 250° C. A sample in which a thin film (thickness of 800 Å) of $Bi_2O_3$ is formed on a surface of a quartz glass by a vacuum evaporation method was irradiated with light dispersed by a spectroscope, and the absorptance thereof was measured. The result of this measurement shows that the absorption edge moves toward a long wavelength side when the film temperature rises from 50° C. to 250° C., and that recording and reproduction of information can be performed by setting the wavelength λ0 of recording light and reproduction light to 405 nm, for example.

Figure 4:
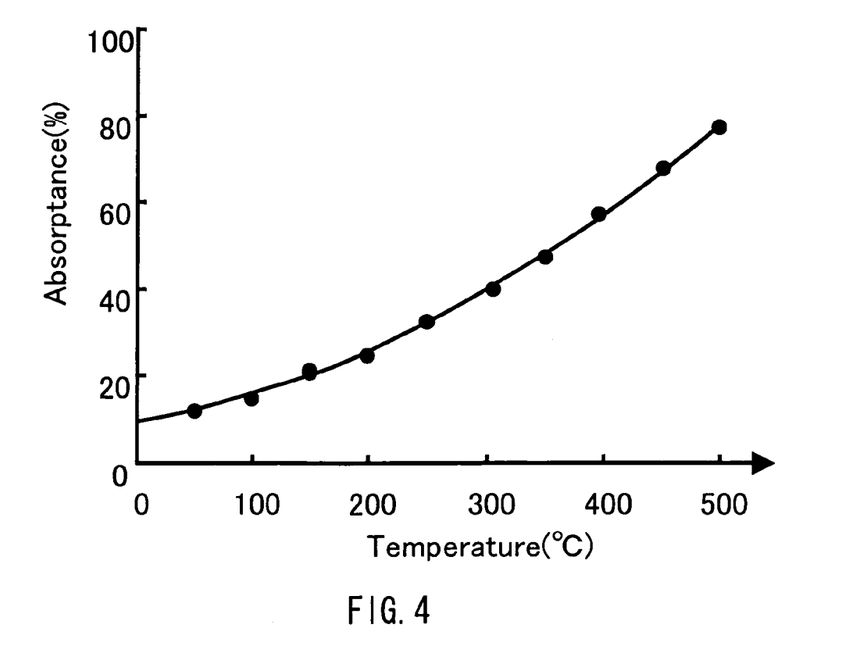
FIG. 4 is a diagram showing the temperature characteristics with respect to the absorptance of $Bi_2O_3$.

Further, FIG. 4 shows the result of measuring the temperature characteristics with respect to the absorptance when light having a wavelength of 405 nm is incident upon the $Bi_2O_3$ film for measurement. The result of the measurement shows that the absorptance increases with temperature, reaching about 80% of absorptance at 500° C.

According to the above-described results, when the variable absorption films 791 and 792 are formed of such a material, the variable absorption films 791 and 792 absorb a part of incident light with a low absorptance at the ordinary temperature at the start of light spot radiation, and rise in temperature following the light absorption. The rise in temperature increases the absorptance, and further light absorption raises the temperature. In this manner, the increased-light-absorption portion 741 is formed in the region of the variable absorption films 791 and 792 that is irradiated with a light spot, and consequently heat generated in this region is dispersed in the recording film, allowing a recording mark to be formed in the recording film. According to the above-described recording method, it is possible to ensure the energy required for recording information even on a multilayer optical recording medium, thereby allowing a large capacity to be realized. Further, since the increased-light-absorption portion 741 formed in the variable absorption films 791 and 792 has a higher extinction coefficient, the reflectance on the interfaces with the recording films 721 and 722, respectively, also increases, resulting in a sufficient amount of reproduction light.

The present embodiment is directed to the optical recording medium in which the three recording layers are stacked. However, the number of recording layers is not limited thereto as long as at least two layers are included. Further, the film configuration of the final recording layer 754 is not limited thereto, and may be the same as that of the first and second recording layers 751 and 752.

In the optical recording medium of the present embodiment, it is preferable to set the reflectance of the respective recording layers and the absorptance of the variable absorption films so that all the recording layers have almost the same amount of absorbed light regardless of the position of the layers from the light incident side. This is because there is no need to change the intensity of recording light for each target recording layer. For example, in the optical recording medium of the present embodiment, when the final recording layer 754 has a film configuration including the variable absorption film 791 or 792 as the first and second recording layers 751 and 752, the reflectance of the respective recording layers 751 and 752 and the absorptance of the respective variable absorption films 791 and 792 preferably have the following relationships, in which the reflectance of the first recording layer 751 is expressed by "$R_1$", the absorptance of the variable absorption film 791 is expressed by "$A_1$", the reflectance of the second recording layer 752 is expressed by "$R_2$", the absorptance of the variable absorption film 792 is expressed by "$A_2$", the reflectance of the final recording layer 754 is expressed by "$R_3$", and the absorptance of the variable absorption film is expressed by "$A_3$".

$$R_1 = R_3/3$$

$$A_1 = A_3/3$$

$$R_2 = R_3/2$$

$$A_2 = A_3/2$$

When the respective recording layers and variable absorption films are formed so as to essentially satisfy the above-mentioned relationships, the intensity of recording light can be kept essentially constant regardless of the recording layers.

Figure 5:
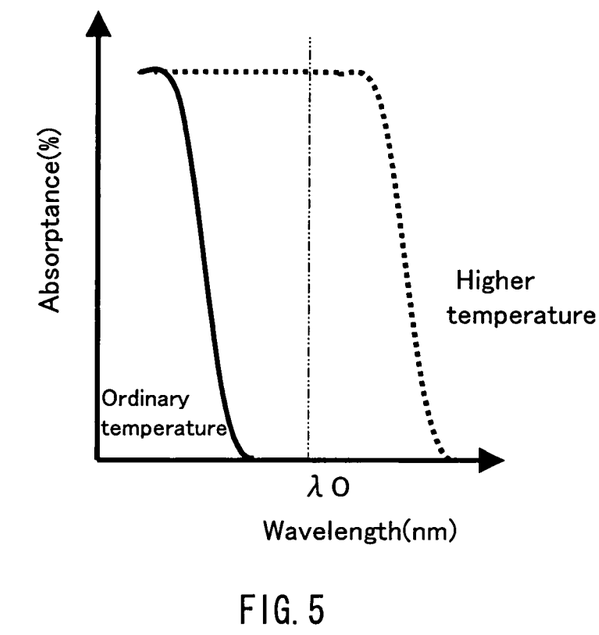
FIG. 5 is a diagram showing another example of the spectral absorptance curve of a variable absorption film included in the optical recording medium according to Embodiment 1 of the present invention.

Further, in the present embodiment, the variable absorption films 791 and 792 are formed of a material that slightly absorbs the light L0 having the wavelength λ0 at the ordinary temperature. However, the variable absorption films 791 and 792 may be formed of a material (having spectral absorptance characteristics as shown in FIG. 5) that is transparent with respect to the light L0 having the wavelength λ0 at the ordinary temperature. In this case, the recording films 721 and 722 may be formed of a material (e.g., TeOx, Te-O-Pd, or the like) that slightly absorbs the light L0 having the wavelength λ0 at the ordinary temperature, so that heat is generated in the recording films 721 and 722 at the start of light spot radiation, and the generated heat raises the temperature of the variable absorption films 791 and 792 to increase the absorptance of the variable absorption films 791 and 792, and the increased-absorption portion 741 is formed in the variable absorption films 791 and 792. When the variable absorption films 791 and 792 and the recording films 721 and 722 are formed as described above, the absorptance with respect to the light having the wavelength λ0 can be changed sharply, and therefore the respective recording layers can be selected more reliably.

According to the optical recording medium of the present embodiment, reproduction of a recording mark at or below the diffraction limit, i.e., so-called super-resolution reproduction also can be performed. Hereinafter, super-resolution reproduction with respect to the optical recording medium of the present embodiment will be described.

Figure 8:
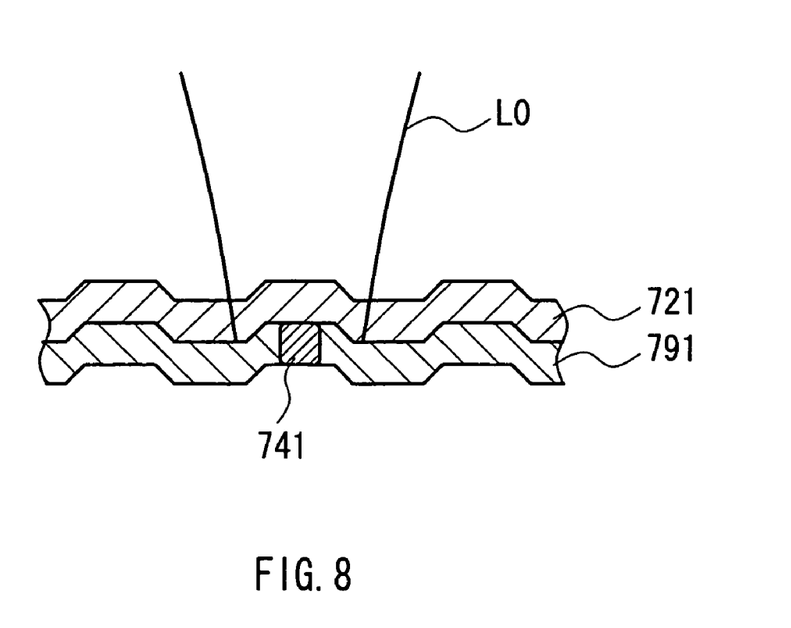
FIG. 8 is a schematic diagram showing the state where super-resolution reproduction is performed with respect to one recording layer of the optical recording medium according to Embodiment 1 of the present invention.
Figure 9:
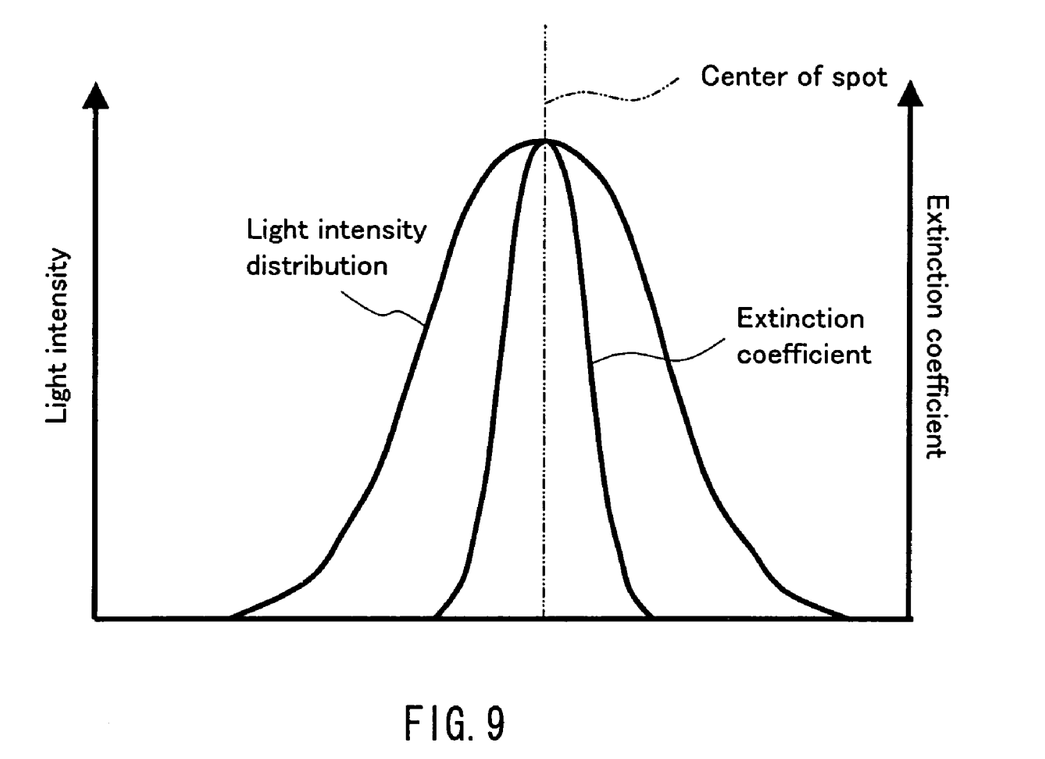
FIG. 9 is a diagram showing the relationship of the region of a light spot to a light intensity and the extinction coefficient of a variable absorption film.

FIG. 8 is a cross-sectional view illustrating a method for performing super-resolution reproduction using the optical recording medium of the present embodiment. FIG. 8 shows the state where light is focused upon the first recording layer 751. In the optical recording medium of the present embodiment, the increased-absorption portion 741 formed in the variable absorption film 791 can be made smaller than the spot size of the light L0. FIG. 9 shows the relationship of the region of a light spot to the light intensity and the extinction coefficient of the variable absorption film. In the case where the optical recording medium of the present embodiment is irradiated with light, a light intensity distribution in a normal light focusing state is expressed by a unimodal form close to the Gaussian function as shown in FIG. 9. Accordingly, in the state where the extinction coefficient is not saturated in the variable absorption film 791, i.e., the state where the extinction coefficient increases with temperature, the variable absorption film 791 has a higher extinction coefficient in a portion nearer to the center of the light spot where the light intensity is higher, while it has a lower extinction coefficient in a portion on the periphery of the center. Here, by controlling the light intensity so that the increased-light-absorption portion 741 in a portion where the extinction coefficient is higher is formed smaller than the spot size of the light L0, super-resolution reproduction as shown in FIG. 8 can be realized.

Embodiment 2

Figure 6:
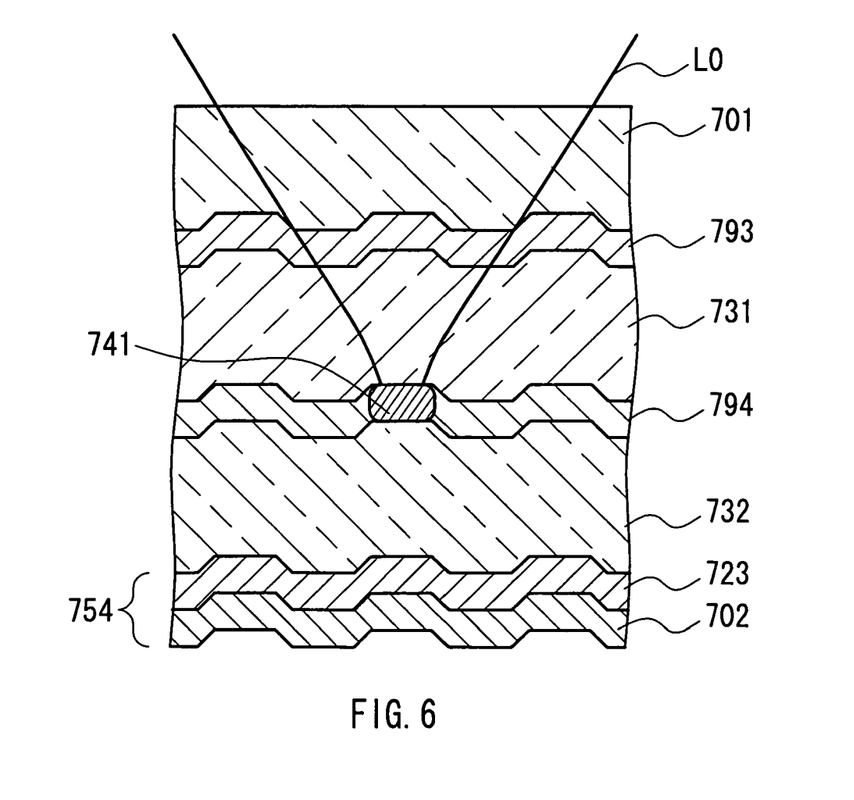
FIG. 6 is a schematic diagram showing a cross-sectional configuration of an optical recording medium according to Embodiment 2 of the present invention, and the state where information is recorded/reproduced on/from the optical recording medium.

FIG. 6 shows a cross-sectional configuration of an optical recording medium of Embodiment 2 of the present invention. The optical recording medium is a multilayer optical recording medium including a substrate 701 on which a variable absorption film 793 serving as a first recording layer, a variable absorption film 794 serving as a second recording layer, and a final recording layer 754 are provided in this order from the incident side of light L0. Separation layers 731 and 732 are provided between the respective recording layers. The variable absorption films 793 and 794 realize in a single film the recording film 721 and the variable absorption film 791, and the recording film 722 and the variable absorption film 792 of the optical recording medium (see FIG. 1) of Embodiment 1, respectively. The separation layers 731 and 732 and the final recording layer 754 are the same as those of the optical recording medium of Embodiment 1, and thus descriptions thereof will be omitted here.

Figure 7:
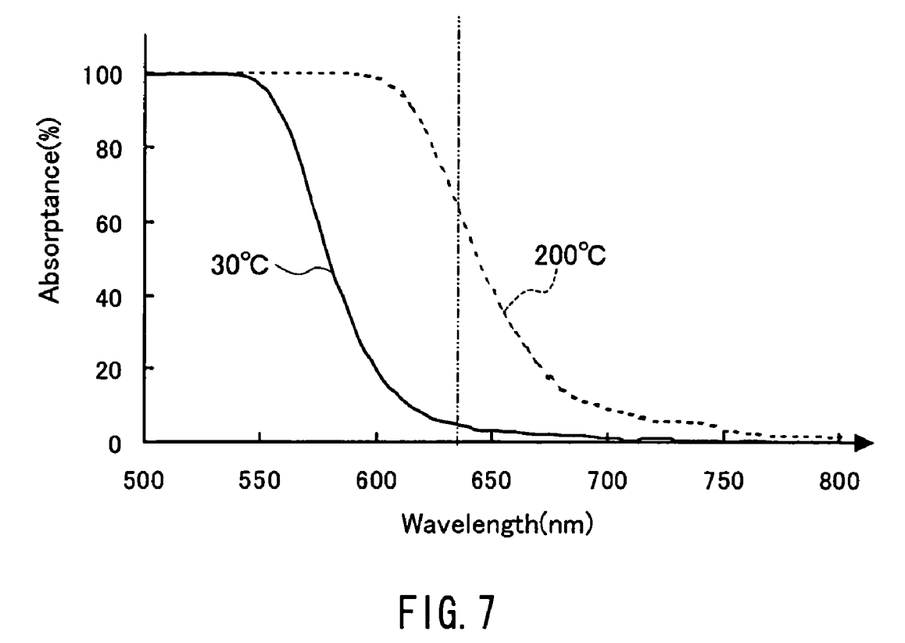
FIG. 7 is a diagram showing the spectral absorptance curve of $As_2S_3$.

The variable absorption films 793 and 794 in the present embodiment are formed of a material having properties in which the films would change in optical characteristics when the temperature rises to a predetermined level, in addition to the characteristics of the variable absorption films 791 and 792 of the optical recording medium of Embodiment 1. A specific example of such a material is $As_2S_3$, for example. FIG. 7 is a diagram showing the result of measuring the spectral characteristics with respect to the absorptance of $As_2S_3$. A sample in which a thin film (thickness of 10 μm) of $As_2S_3$ is formed on a surface of a quartz glass by a vacuum evaporation method was irradiated with light dispersed by a spectroscope, and the absorptance thereof was measured.

The result of this measurement shows that the absorption edge moves toward a long wavelength side when the film temperature rises from 30° C. to 200° C. In the case where the variable absorption films 793 and 794 are formed using $As_2S_3$, when the wavelength of recording light and reproduction light is 630 nm, for example, the absorptance is about 5% at 30° C., while the absorptance increases to about 60% at 200° C. Consequently, an increased-light-absorption portion 741 is formed in the region of the variable absorption films 793 and 794 that is irradiated with a light spot, and heat generation is caused in this region as in Embodiment 1. Further, recording of information is performed by raising the temperature of the variable absorption films 793 and 794 to the melting point (300° C.) of $As_2S_3$, and cooling the same rapidly, so as to form an amorphous phase portion. The amorphous phase portion corresponds to a recording mark. Deletion of information is performed by raising the temperature of the variable absorption films 793 and 794 to the crystallization temperature of $As_2S_3$, and cooling the same slowly, so as to cause phase transition from an amorphous phase to a crystal phase. Reproduction of information recorded in the variable absorption films 793 and 794 is performed as in Embodiment 1 by using light having a power that causes no recording mark to be formed in the variable absorption films 793 and 794.

As described above, according to the optical recording medium of the present embodiment, it is possible to ensure the energy required for recording information even on a multilayer optical recording medium, thereby allowing a large capacity to be realized. Further, since the increased-light-absorption portion 741 has a higher extinction coefficient, the reflectance increases, resulting in a sufficient amount of reproduction light.

The present embodiment is directed to the case where the wavelength λ0 of the recording light and reproduction light is 630 nm as an example. However, the wavelength is not limited thereto, and the present embodiment can be realized with other wavelengths by selecting a material for the variable absorption films 793 and 794 as appropriate. For example, when the wavelength λ0 is 405 nm, a mixed glass of $TeO_2$-$CaO$-$WO_3$ or the like may be used to form the variable absorption films 793 and 794.

Further, the optical recording medium of the present embodiment also allows super-resolution reproduction as the optical recording medium of Embodiment 1.

Furthermore, the present embodiment is directed to the optical recording medium including the three recording layers. However, an optical recording medium that is further multilayered also may be realized as long as it includes at least two layers.

INDUSTRIAL APPLICABILITY

According to an optical recording medium, an optical information processor, and an optical recording/reproducing method of the present invention, it is possible to ensure the energy required for recording information even on a multilayer optical recording medium including a plurality of recording layers, thereby allowing a large capacity to be realized. Further, a sufficient amount of reproduction light can be obtained when recorded information is reproduced.

The invention claimed is:

1. A multilayer optical recording medium including a plurality of recording layers for recording/reproducing information by irradiation with light having a wavelength λ0,
   wherein at least one of the plurality of recording layers includes a variable absorption film,
   the variable absorption film includes a material in which electron energy has a band structure and an absorption edge of an absorption spectrum moves toward a long wavelength side in accordance with a rise in temperature by light absorption caused by interband transition of an electron,
   the material includes as a main component at least one selected from the group consisting of $Bi_2O_3$, $As_2S_3$, a mixed glass including $TeO_2$ and $Na_2O$, a mixed glass including $TeO_2$ and $WO_3$, a mixed glass including $TeO_2$ and $Fe_2O_3$, a mixed glass including $TeO_2$ and $CuO$, a mixed glass including $TeO_2$, $CaO$, and $WO_3$, and AlGaInAs as a compound semiconductor,
   the variable absorption film has a first absorptance with respect to the light having the wavelength λ0 when the variable absorption film has a first temperature, and has a second absorptance higher than the first absorptance with respect to the light having the wavelength λ0 when the variable absorption film has a second temperature higher than the first temperature, the material of the variable absorption film changes in optical characteristics so as to change from an unrecorded state to a recorded state at a predetermined temperature, and a recording mark is formed in a portion of the variable absorption film where the predetermined temperature has been reached, so that information is recorded in said portion of the variable absorption film.

2. The optical recording medium according to claim 1, wherein at the first temperature, the variable absorption film absorbs the light having the wavelength λ0 as a result of light absorption caused by interband transition of an electron in the material.

3. The optical recording medium according to claim 1, wherein the first temperature is an ambient temperature of use of the optical recording medium.

4. The optical recording medium according to claim 1, wherein the plurality of recording layers consist of n ("n" is an integer equal to or larger than 2) layers, each including the variable absorption film, and when a recording layer that is m-th ("m" is an integer satisfying $1<m\leq n$) in order from a light incident side among the plurality of recording layers is an m-th recording layer, a reflectance $R_m$ of the m-th recording layer with respect to the light having the wavelength λ0 and an absorptance $A_m$ of the variable absorption film included in the m-th recording layer satisfy following relationships at the first temperature:

$$R_m = R_n/(n-m+1)$$

$$A_m = A_n/(n-m+1).$$

5. A multilayer optical recording medium including a plurality of recording layers for recording/reproducing information by irradiation with light having a wavelength λ0,
wherein the wavelength λ0 satisfies 350 nm<λ0<405 nm,
at least one of the plurality of recording layers includes a film whose main component is $Bi_2O_3$, and
the film has a first absorptance with respect to the light having the wavelength λ0 when the film has a first temperature, and has a second absorptance higher than the first absorptance with respect to the light having the wavelength λ0 when the film has a second temperature higher than the first temperature.

6. An optical information processor, comprising:
the optical recording medium according to claim 1;
a light source for emitting light having a wavelength λ0;
a focusing optical system for focusing the light emitted from the light source upon a target recording layer included in the optical recording medium; and
a photodetector for detecting light reflected by the optical recording medium,
wherein an increased-light-absorption portion is formed in the variable absorption film by irradiation with the light emitted from the light source, and information is recorded or reproduced by raising a temperature of the increased-light-absorption portion.

7. The optical information processor according to claim 6, further comprising a control part for controlling an intensity of the light emitted from the light source so that the increased-light-absorption portion farmed in the variable absorption film is smaller than a spot size of the focused light.

8. An optical recording/reproducing method for recording and reproducing information on/from the optical recording medium according to claim 1, comprising:
forming an increased-light-absorption portion in a variable absorption film included in the recording layer by focusing light having a wavelength λ0 upon a target recording layer; and
recording/reproducing information in/from the recording layer by raising a temperature of the increased-light-absorption portion.

9. The optical recording/reproducing method according to claim 8, further comprising controlling an intensity of the light so that the increased-light-absorption portion formed in the variable absorption film is smaller than a spot size of the focused light 10. An optical recording/reproducing method for recording and reproducing information on/from the optical recording medium according to claim 1, comprising:
forming an increased-light-absorption portion in a variable absorption film included in the recording layer by focusing light having a wavelength λ0 upon a target recording layer; and
recording/reproducing information in/from the recording layer by raising a temperature of the increased-light-absorption portion.

11. The optical recording medium according to claim 5, wherein the first temperature is an ambient temperature of use of the optical recording medium.

12. An optical information processor, comprising:
the optical recording medium according to claim 5;
a light source for emitting light having a wavelength λ0;
a focusing optical system for focusing the light emitted from the light source upon a target recording layer included in the optical recording medium; and
a photodetector for detecting light reflected by the optical recording medium,
wherein an increased-light-absorption portion is formed in the film whose main component is $Bi_2O_3$ by irradiation with the light emitted from the light source, and information is recorded or reproduced by raising a temperature of the increased-light-absorption portion.

13. The optical information processor according to claim 12, wherein an output of the light source is controlled in accordance with a data signal obtained from a signal detected by the photodetector.

14. The optical information processor according to claim 6, wherein an output of the light source is controlled in accordance with a data signal obtained from a signal detected by the photodetector.

* * * * *

UNITED STATES PATENT AND TRADEMARK OFFICE
CERTIFICATE OF CORRECTION

PATENT NO. : 7,656,777 B2
APPLICATION NO. : 10/516220
DATED : February 2, 2010
INVENTOR(S) : Yamamoto et al.

Page 1 of 1

It is certified that error appears in the above-identified patent and that said Letters Patent is hereby corrected as shown below:

Column 13, line 38 (claim 5): "$\lambda 0$when" should be -- $\lambda 0$ when --.
Column 14, line 4 (claim 7): "farmed" should read "formed".

Signed and Sealed this
Fifth Day of April, 2011

David J. Kappos
*Director of the United States Patent and Trademark Office*